Patented Oct. 16, 1951

2,571,686

UNITED STATES PATENT OFFICE 2,571,686

METHOD OF RECOVERING CELLULOSE ESTER FILM SCRAP

Harry I. Davis, Rochester, N. Y., assignor to Eastman Kodak Company, Rochester, N. Y., a corporation of New Jersey No Drawing. Application October 18, 1950,
Serial No. 190,880

4 Claims. (Cl. 260—230)

This invention relates to the reclamation of film scrap having a base of cellulose nitrate or a cellulose ester of a fatty acid, including the treatment of the scrap with iron or aluminum hydroxide.

Cellulose ester film ordinarily consists of a base of cellulose nitrate or a lower fatty acid ester of cellulose having thereon subbing and backing layers and a gelatin-silver halide photographic emulsion on the surface thereof. Considerable quantities of such film are scrapped and the film base portion thereof can be recovered for reuse.

The best method which has been proposed up to now, to my knowledge, for the recovery of cellulose ester film scrap involves comminuting the scrap and first treating it with hot water containing pancreatin or some other digestive enzyme for a sufficient time to completely remove the gelatin layer therefrom. The material is then washed and covered with a dilute solution of sodium hydroxide at an elevated temperature such as 120–200° F., whereby the various subbing layers, dye layers and the like, are loosened from the cellulose ester which is to be reclaimed. Ordinarily, a proportion of alkali liquid to film of 20:1 is used. This treatment of film scrap with warm dilute alkali causes a surface hydrolysis thereof so that the ester itself may be dissolved in a suitable solvent and the hydrolyzed surface remains insoluble therein.

It has been found, however, that difficulties arise in separating the solution of the cellulose ester from the hydrolyzed insolubles, in that the insoluble material is in a form which quickly clogs a filter press or if centrifuging is used, this material has too low a density to be efficiently separated from the solution of the cellulose ester.

One object of my invention is to provide a method of treating the film scrap whereby the hydrolyzed material does not offer difficulties when it is attempted to separate it from the solution of the cellulose ester. Another object of my invention is to provide a method of facilitating film scrap recovery by the use of iron or aluminum ions. Other objects of my invention will appear herein.

I have found that if alkali treated scrap, such as described above, is treated before rinsing off the aqueous alkali with a solution of an iron or aluminum salt that the iron or aluminum compound will be precipitated on, or in the hydrolyzed material in an insoluble form or will be absorbed into this hydrolyzed material and be converted to the insoluble form by treatment with the appropriate negative ion. By this means, the relative density of the insoluble layer is increased to a point to which it can be readily centrifuged from a dilute solution of the cellulose ester base.

My invention is carried out by first draining off the alkali liquid from the film scrap and then treating the scrap with an aqueous solution of a ferrous, ferric or aluminum salt so that an excess of the ferrous, ferric or aluminum ion is present. Any of the water-soluble salts of these compounds may be employed. For instance, although iron sulfate is the most common iron salt and the most readily adaptable to this process, other water-soluble iron salts such as the nitrate or the chloride (ferrous or ferric) may be employed. In the case of aluminum, the sulfate, the nitrate or the acetate are especially suitable for use in this procedure. The proportions in the treatment which I have described are not particularly critical, it only being necessary that enough ferrous, ferric or aluminum ion be used that the density of the hydrolyzed material is substantially increased by this treatment. In the case of the ferrous compounds, oxidation to the ferric state will occur, but this action is without any significance and the resulting ferric compound formed accomplishes the desired purpose.

After this treatment has taken place, the scrap is dried and dissolved in a suitable solvent for the film base. In the case of cellulose acetate film base such as having an acetyl content within the range 38–41.5 percent, acetone or any other solvent therefore may be employed for forming the solution of the film base. In the case of cellulose triacetate such as having an acetyl content of more than 43 percent, methylene dichloride-methyl alcohol is usually suitable for this purpose although any other solvents for this cellulose ester may be used. In the case of mixed esters such as cellulose acetate propionate or cellulose acetate butyrate, such as those having a propionyl or butyryl content of 10–30 percent, acetone, methylene chloride-alcohol or any other suitable solvent may be employed. In the case of cellulose nitrate, any suitable solvent may be used. For instance, methyl alcohol-acetone has been found to be quite useful for this purpose when processing cellulose nitrate scrap.

The following example illustrates the recovery of film scrap in accordance with my invention:

One hundred parts of the perforations obtained in the manufacture of a cellulose triacetate base cine film were immersed in 2,000 parts of a 1 percent solution of sodium hydroxide in water for 3 hours at 140° F. The perforations were then drained off the alkali solution but not rinsed. There was then added to the vessel containing the perforations 800 parts of a 0.5 percent solution of ferrous sulfate in water. After the perforations had remained in this solution for 1 or 2 minutes, the material was drained and was washed thoroughly with water. The ferrous hydroxide which had precipitated on the surface of the perforations oxidized to the brown ferric state. These perforations were dried and the material was dissolved in a mixture of methylene dichloride and methanol (84.3:15.7) using 15 parts of this solvent mixture to one part of scrap. Upon centrifuging of this solution, it was found that the insoluble portions centrifuged out in less than 5 minutes give a clear solution whereas a similar sample of hydrolyzed scrap which had no iron added would not centrifuge clear in 20 minutes.

The above example was repeated except that aluminum nitrate was used in place of ferrous sulfate and similar results were obtained.

It is desirable in treating film scrap in accordance with my invention that the amount of ferrous, ferric or aluminum ion present be sufficient to react with all the alkali which is present in the drained wet film scrap. Ordinarily, a 1 percent sodium hydroxide solution is used and in that case the calculation of the amount of the iron or aluminum salt necessary would be made on that basis. Also, the amount of iron or aluminum salt to employ depends upon the amount of alkali which is retained on the scrap after draining the treatment liquid therefrom, it only being necessary that the amount of iron or aluminum salt present be in excess so as to combine with all of the alkali present.

I claim:

1. In the method of reclaiming cellulose ester film scrap in which the scrap is subjected to surface hydrolysis with dilute alkali and then drained, the step which comprises treating the drained film scrap with an aqueous solution of a water-soluble salt selected from the group consisting of the water-soluble iron and aluminum salts, this salt being present in the treating liquid in an amount sufficient to combine with all of the alkali present on the film scrap.

2. In a method of recovering cellulose ester scrap in which the scrap is subjected to a surface hydrolysis by means of a dilute alkali solution which is then drained from the scrap, the step which comprises treating the drained scrap with an aqueous solution of ferrous sulfate in an amount sufficient to combine with all of the alkali present on the scrap.

3. In a method of recovering cellulose ester scrap in which the scrap is subjected to a surface hydrolysis by means of a dilute alkali solution which is then drained from the scrap, the step which comprises treating the drained scrap with an aqueous solution of aluminum acetate in an amount sufficient to combine with all of the alkali present on the scrap.

4. A method for recovering cellulose acetate having an acetyl content of at least 43 percent from film scrap having a base thereof which comprises surface hydrolyzing the scrap with dilute alkali, draining alkali from the scrap and then treating the so drained scrap with an aqueous solution of a water-soluble salt selected from the water-soluble iron and aluminum salts, the salt being present in the solution in an amount in excess of that necessary to react with all of the alkali present on the film scrap.

HARRY I. DAVIS.

No references cited.